United States Patent [19]

Fisher et al.

[11] 3,855,215

[45] Dec. 17, 1974

[54] METHINE COMPOUNDS

[75] Inventors: John G. Fisher; Curtis E. Diebert, both of Kingsport, Tenn.

[73] Assignee: Eastman Kodak Company, Rochester, N.Y.

[22] Filed: Feb. 7, 1973

[21] Appl. No.: 330,357

Related U.S. Application Data

[63] Continuation-in-part of Ser. No. 215,440, Jan. 4, 1972, abandoned.

[52] U.S. Cl. ......... 260/243 A, 8/162 R, 260/240 R, 260/244 R, 260/326.44
[51] Int. Cl. ............................................. C09b 23/00
[58] Field of Search ......... 260/240 J, 240 R, 244 R, 260/243 A

[56] References Cited
UNITED STATES PATENTS

| | | | |
|---|---|---|---|
| 3,424,756 | 1/1969 | Fisher et al. | 260/294.9 |
| 3,453,270 | 7/1969 | Weaver et al. | 260/244 |

FOREIGN PATENTS OR APPLICATIONS

| | | | |
|---|---|---|---|
| 932,343 | 8/1955 | Germany | 260/240 J |
| 1,003,573 | 2/1957 | Germany | 260/240 J |

OTHER PUBLICATIONS

Buu–Hoi et al., J. Chem. Soc., 1969, Section C, pp. 2137 to 2138.

*Primary Examiner*—John D. Randolph

[57] ABSTRACT

3-Cyanovinylene-10-aryl-phenoxazines and phenothiazines produce fluorescent, light-fast yellowish-orange to reddish-orange shades on polyester and cellulose acetate fibers.

7 Claims, No Drawings

METHINE COMPOUNDS

This invention concerns novel phenoxazine and phenothiazine methine dyes which are useful for dyeing polyester and cellulose acetate fibers.

Our novel methine compounds have the general formula (1) 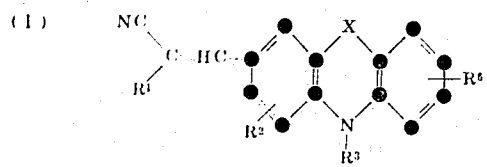

wherein
X is oxygen or sulfur;
$R^1$ is cyano; alkoxycarbonyl containing from one to about nine carbon atoms; alkoxycarbonyl containing 3–5 carbon atoms substituted on the beta, gamma or delta carbon atom with one substituent selected from the group consisting of lower alkoxy, hydroxy, cyano, halogen, succinimido, glutarimido; or phthalimido; lower alkylsulfonyl; arylsulfonyl; or the group —$CONR^4R^5$ in which $R^4$ is hydrogen, lower alkyl, aryl or, when $R^5$ is hydrogen, $R^4$ also can be lower alkanoyl or lower alkoxycarbonyl and $R^5$ is hydrogen or lower alkyl;
$R^2$ is hydrogen, lower alkyl or lower alkoxy;
$R^3$ is aryl; and
$R^6$ is hydrogen, lower alkyl or lower alkoxy;
in which each aryl moiety is phenyl, lower alkylphenyl, lower alkoxyphenyl or halophenyl.

The novel compounds of the invention produce yellowish-orange to reddish-orange shades on polyester fibers when applied thereto according to conventional disperse dyeing procedures. Due to their fluorescence, our compounds produce unusually bright shades, especially when dyeings thereof are viewed under natural light. Our methine compounds also exhibit, in general, good fastness to light and dyeability properties.

The substituents encompassed by the generic language appearing in the definitions of $R^1$ through $R^5$ are well known in the art and can be derived from known compounds according to published procedures. As used herein to describe any alkyl moiety, "lower" designates a carbon content of one to about four carbon atoms. Chlorine and bromine are preferred halogen atoms which can be present on our novel compounds.

The methine compounds of formula (1) in which $R^1$ is cyano or lower alkoxycarbonyl, $R^2$ and $R^4$ each is hydrogen and $R^3$ is phenyl or tolyl, are especially preferred due their excellent properties and relative economy.

The novel compounds of the invention are prepared by condensing a 3-formyl-10-arylphenoxazine or a 3-formyl-10-arylphenothiazine with an active methylene compound having the formula $NC-CH_2-R^1$. The condensation generally is conducted under basic conditions in an organic solvent at a temperature of 60° to 100°C. For example, the reaction can be conveniently conducted in benzene at reflux using piperidine as the basic catalyst. The methine compounds can be isolated by cooling the reaction mixture, whereupon the product crystallizes from solution.

The intermediate aldehydes are prepared by the formylation of the corresponding 10-arylphenothiazine or 10-arylphenoxazine with a Vilsmeier-type formylating agent. Depending upon the atom represented by X and position(s) of the substituents, if any, represented by $R^2$ and $R^4$ and those present on the phenyl nucleus of $R^3$, some formylation reactions may lead to multiple formylation products. Thus, the methine dyes prepared directly from such multiple formylation products are a mixture. The mixture of methine compounds, consisting of at least one compound conforming to formula (1), can be used to produce bright dyeings as described hereinabove or, in certain cases, a single methine compound can be obtained by isolating the 3-formyl intermediate prior to condensation with an active methylene compound. For example, formylation of 10-phenylphenothiazine with phosphorus oxychloride and N-methylformanilide gives a mixture of 3-formyl-10-phenylphenothiazine and 10-(4-formyphenyl)-phenothiazine in a mole ratio of about 4 to 1. The 3-formyl-10-phenylphenothiazine can be obtained in a pure state from the aldehyde mixture by distillation and recrystallization. The pure 3-substituted phenothiazine dyes can then be prepared from this purified aldehyde. The phenothiazine and phenoxazine starting materials and the active methylene compounds are available intermediates and/or can be prepared according to published techniques.

The following examples further illustrate the preparation of our novel compounds.

EXAMPLE 1

3-Formyl-10-phenylphenoxazine (1.0 g., 3.5 moles), ethyl cyanoacetate (0.47 g., 4.2 moles), ethanol (25 ml.) and piperidine (1 drop) are combined and heated at reflux for 3 hr. The mixture is chilled and filtered and an orange solid, ethyl α-cyano-10-phenylphenoxazine-3-acrylate, is obtained. Yield: 1.22 g.; m.p. 193°–195°C.; visible λ = 464 nm. (acetone). This brilliant orange, fluorescent dye displays excellent dyeing and fastness properties on cellulose ester and polyester fibers.

EXAMPLE 2

The procedure described in Example 1 is repeated except that 3-formyl-10-phenylphenoxazine and malononitrile are employed as starting materials. A red solid is obtained; m.p. 189°–192°C.; visible λ max = 483 nm. (acetone). The product, 10-phenyl-3-phenoxazinylmethylenemalononitrile, produces fluorescent, orange shades and displays excellent dyeing and fastness properties on polyester fibers.

EXAMPLE 3

The procedure of Example 1 is repeated except that a mixture of phenothiazine aldehydes and ethyl cyanoacetate are used. The orange, fluorescent material, consisting of a mixture of 10-phenyl-3-phenothiazinylmethylenemalononitrile and p-(10-phenothiazinyl)-benzylidene malononitrile, obtained dyes cellulose acetate and polyester fibers bright orange shades and displays excellent dyeing and light-fastness properties.

The methine compounds set forth in the examples of the following table conform to formula (1) and are prepared by the procedures described hereinabove. The color given for each compound refers to the shade it produces on polyester fibers.

| Ex. No. | R¹ | R², R⁶ | R³ | X | Color |
|---|---|---|---|---|---|
| 4 | —CN | H | —C₆H₅ | —S— | Reddish-orange. |
| 5 | —SO₂C₆H₅ | H | —C₆H₅ | —S— | Do. |
| 6 | —CN | 8-CH₃ | —C₆H₅ | —O— | Orange. |
| 7 | —COOC₂H₅ | H | —C₆H₅ | —O— | Yellowish-orange. |
| 8 | —COO(CH₂)₃CH₃ | H | —C₆H₅ | —O— | Do. |
| 9 | —CONHCOOC₂H₅ | H | —C₆H₅ | —O— | Do. |
| 10 | —COOCH₂CH₂CH₃ | H | —C₆H₅ | —O— | Do. |
| 11 | —CONH₂ | 2,7-di-CH₃ | —C₆H₄-p-OCH₃ | —S— | Orange. |
| 12 | —CON(CH₃)₂ | 7-OCH₃ | —C₆H₄-m-Cl | —S— | Do. |
| 13 | —COOCH₂CH₂OCH₃ | H | —C₆H₅ | —S— | Do. |
| 14 | —COOC₂H₅ | H | —C₆H₅ | —S— | Do. |
| 15 | —COO(CH₂)₃CH₃ | H | —C₆H₅ | —S— | Do. |
| 16 | —CONHCOOC₂H₅ | H | —C₆H₅ | —S— | Do. |
| 17 | —COOCH₂CH(C₂H₅)(CH₂)₃CH₃ | H | —C₆H₅ | —S— | Do. |
| 18 | —CN | 2,6-di-CH₃ | —C₆H₄-p-CH₃ | —S— | Reddish-orange. |
| 19 | —COOC₂H₅ | H | —C₆H₄-p-CH₃ | —S— | Orange. |
| 20 | —COOCH₂CH₂OCH₃ | H | —C₆H₄-p-CH₃ | —S— | Do. |
| 21 | —SO₂C₆H₅ | H | —C₆H₄-p-CH₃ | —S— | Do. |
| 22 | —COO(CH₂)₃CH₃ | 4,6-di-CH₃ | —C₆H₄-p-CH₃ | —S— | Do. |
| 23 | —COOCH₂CH₂NCOCH₂CH₂CO | H | —C₆H₄-p-CH₃ | —S— | Do. |

The polyester and cellulose acetate fibers which can be dyed with our novel compounds and the techniques by which our compounds are applied are well known in the art. See, for example, French Pat. No. 2,088,404 and U.S. Pat. No. 3,491,082 and 3,553,245.

This invention has been described in detail with particular reference to certain preferred embodiments thereof, but it will be understood that variations and modifications may be made without departing from the spirit and scope of the invention as described hereinabove.

We claim:

1. A compound of the general formula (1) 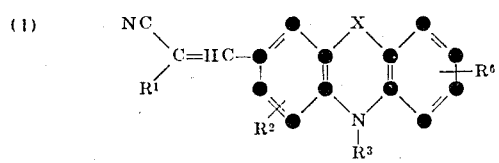

wherein
X is oxygen or sulfur;
R¹ is cyano; alkoxycarbonyl containing from one to about nine carbon atoms; alkoxycarbonyl containing 3–5 carbon atoms substituted on the beta, gamma or delta carbon atom with one substituent selected from the group consisting of lower alkoxy, hydroxy, cyano, halogen; lower alkylsulfonyl; arylsulfonyl; or the group —CONR⁴R⁵ in which R⁴ is hydrogen, lower alkyl, aryl or, when R⁵ is hydrogen, R⁴ also can be lower alkanoyl or lower alkoxycarbonyl and R⁵ is hydrogen or lower alkyl;
R² is hydrogen, lower alkyl or lower alkoxy;
R³ is aryl; and
R⁶ is hydrogen, lower alkyl or lower alkoxy;
in which each aryl moiety is phenyl, lower alkylphenyl, lower alkoxyphenyl or halophenyl.

2. A compound according to claim 1 wherein
X is oxygen or sulfur;
R¹ is cyano; alkoxycarbonyl containing from one to about nine carbon atoms; lower alkylsulfonyl; arylsulfonyl; or the group —CONR⁴R⁵ in which R⁴ is hydrogen, lower alkyl, aryl or, when R⁵ is hydrogen, R⁴ also can be lower alkanoyl or lower alkoxycarbonyl, and R⁵ is hydrogen or lower alkyl;
R² is hydrogen, lower alkyl or lower alkoxy;
R³ is aryl; and
R⁶ is hydrogen, lower alkyl or lower alkoxy.

3. A compound according to claim 1 having the formula

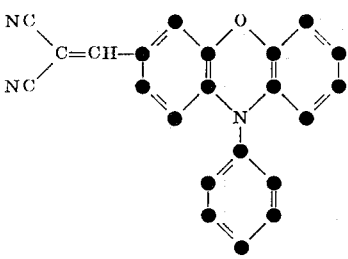

4. A compound according to claim 1 having the formula

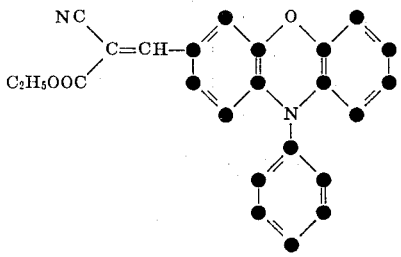

5. A compound according to claim 1 having the formula

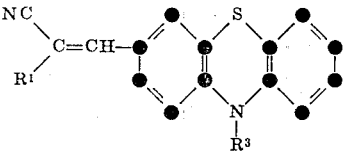

wherein R¹ is cyano or lower alkoxycarbonyl and R³ is phenyl or tolyl.

6. A compound according to claim 1 having the formula

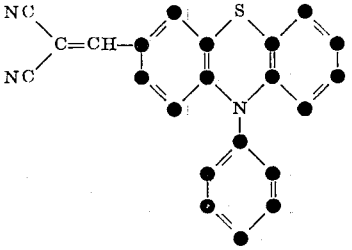

7. A compound according to claim 1 having the formula

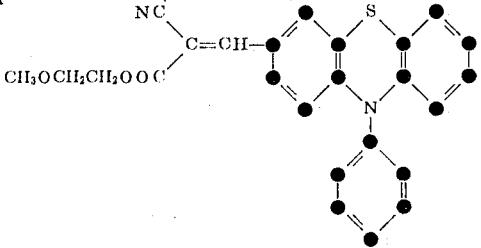

* * * * *